Patented Oct. 7, 1952

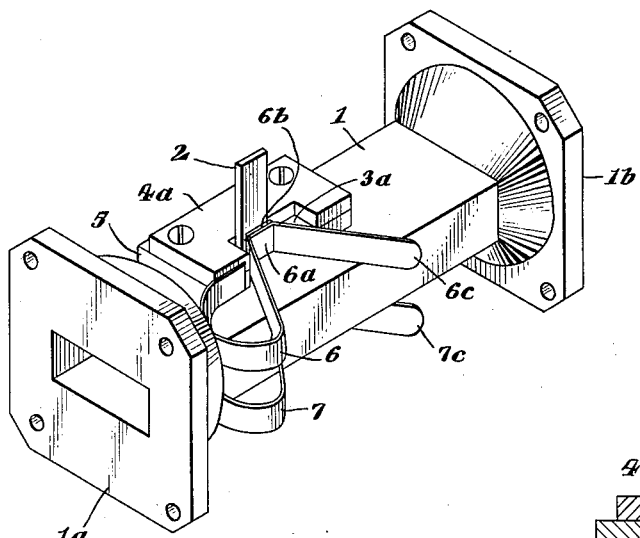
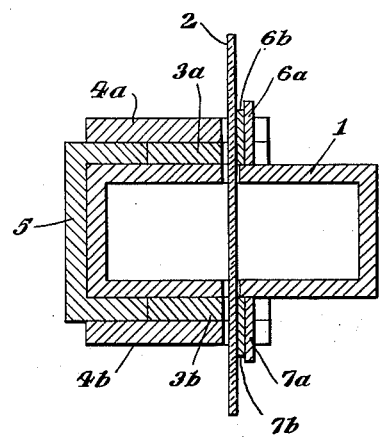
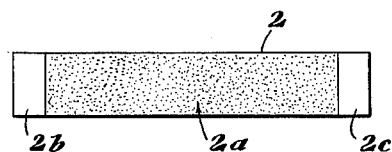
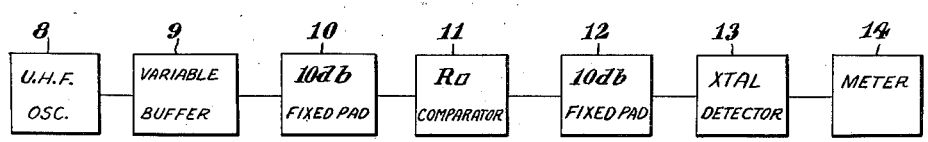

2,613,251

UNITED STATES PATENT OFFICE 2,613,251

RESISTANCE COMPARATOR

John E. Ebert, Woodside, N. Y., assignor to Polytechnic Institute of Brooklyn, Brooklyn, N. Y., a corporation of New York Application February 11, 1947, Serial No. 727,839

12 Claims. (Cl. 175—183)

This invention relates to an arrangement for testing resistance elements by comparing an element of an unknown resistance with an element of known resistance.

The invention is especially useful for testing resistance elements used as attenuators in wave guides for electromagnetic waves of microwave frequencies. Such resistance elements are commonly formed of a thin metal film carried on one face of a thin and narrow glass plate. After the film has been deposited on the plate, it is usually covered with a protective insulating coating which makes it impossible to obtain electrical contact with closely spaced points on the resistance film for the purpose of testing different sections thereof.

One object of the invention is to devise an arrangement for testing the uniformity of the metal film on a resistance strip along different linear portions of the strip.

It is also possible to test the uniformity of a series of plates by comparing them with a standard plate.

Another object of the invention is to devise an arrangement for testing or comparing a resistance without the necessity of making electrical contacts with the element. This feature of the invention makes it possible to test short sections of a resistance element that is completely covered with a protective insulating coating.

My invention also involves a novel method of testing or comparing resistance elements by inserting the element to be tested or compared within a wave guide carrying high frequency energy and noting or comparing the amount of attenuation produced by the element with relation to the attenuation produced by an element of known resistance.

The invention will be explained in connection with the accompanying drawing in which:

Figure 1 is a perspective view of the resistance comparator;

Figure 2 is a sectional view of Figure 1 taken along the line 2—2 and shown on a larger scale;

Figure 3 is a side view of a resistance plate to be tested; and

Figure 4 is a diagrammatic showing of the testing system in which the resistance comparator is used.

Referring to the drawing, the comparator is formed of a short section of rectangular wave guide 1 having coupling flanges 1a and 1b at the two ends for insertion into a wave guide system. A pair of short narrow slots are formed in the two broad walls of the wave guide section 1, longitudinally thereof and approximately at the center of the walls. These slots are arranged in alignment to receive the resistance plate 2, and the length of the two slots must be somewhat greater than the width of the plate 2. Preferably, the width of the slots should be no greater than that necessary to provide a small clearance for easy sliding of the plate through the slots. A pair of magnetic choke bars 3a and 3b are arranged on one side of the slots formed in the two walls, and these chokes are clamped into position by a pair of clamping plates 4a and 4b which are secured to a heavy frame 5 which is soldered or otherwise mounted on one side of the guide section 1. The chokes 3a and 3b are formed of suitable loss-producing magnetic material such as "Polyiron" consisting of comminuted iron which is formed into shape under pressure with or without a binder. These chokes are provided to reduce the amount of energy lost through the slots formed in the guide section 1. As shown in the drawing, the parts 3a, 3b, 4a and 4b are notched to provide guiding surfaces located in the same plane as two aligned side walls of the slots, thus providing a guideway for passing resistance plates through the slots.

The plate 2 is held in position in the slots by quick-releasable clamping means formed of a pair of spring fingers 6 and 7. These fingers are secured at one end to the frame 5 and intermediate sections 6a and 7a bear against the plate 2 on opposite sides of the guide section 1 with rubber pads 6b and 7b interposed to prevent injury to the resistance plate. The terminal portions of the springs 6 and 7 extend outwardly beyond the side of the guide section 1 as shown at 6c and 7c, to facilitate release of the fingers for the insertion or removal of a resistance plate.

It will be understood that the resistance plates as shown in Figure 3 are formed of relatively long and narrow thin glass plates having a thin metallic film 2a formed on one or both faces thereof. The end sections of the plate may be provided with thicker terminal coatings 2b and 2c of low resistance. Usually the thin film 2a will be covered with a protective layer of insulating material. For certain purposes to be explained, the wave guide should have a narrow transverse dimension which is small by comparison with the length of the resistance plates.

Figure 4 is a diagrammatic representation of the testing system in which the comparator of Figure 1 is used. The arrangement involves a source of ultra high frequency oscillations represented at 8 supplying energy to a wave guide through a variable buffer attenuator 9. The wave guide system preferably includes a fixed pad 10 inserted in front of the comparator 11, and a second fixed pad 12 is inserted after the comparator and in front of the crystal detector 13 which is connected to the meter 14.

In using the comparator to test the uniformity of film on a resistance plate, the plate is inserted into the slots, and the buffer 9 is adjusted until the meter 14 has any convenient reading. The plate 2 is then moved to expose different linear sections to the wave energy flowing in the wave guide, and any variation in the film on the plate will be indicated by changes in the reading of meter 14. It will be understood that the portion of the plate 2 which is positioned within the guide section 1 is arranged parallel with the plane of the electric field within the guide and will absorb energy from the waves being transmitted through the guide.

The comparator may be used as a tolerance indicator by first inserting a "standard" resistance plate having a resistance value which represents the high limit of resistance. The buffer is then adjusted to give full scale reading on the meter 14. The high tolerance standard plate is now replaced by another standard plate with a resistance corresponding to the "low" limit of resistance, and the new meter reading is noted. The production plates of unknown resistance are now inserted in the comparator, and any plate which produces a meter reading above or below the two readings for the two standard plates is outside of the tolerence limits and must be rejected.

It will be understood that for accurate comparison, the dielectric carrier plates of the resistance elements must be formed of the same dimensions and of the same material as the standard or comparison plates. The comparison will not be accurate if the production plates are formed of material having a different dielectric constant from the standard plates.

By making the thickness of the resistance film small by comparison with the depth of current penetration at the highest frequency used, the current distribution will be even throughout the film thickness, and the meter 14 may be calibrated to indicate the correct resistance value in ohms per square. The resistance value of the standard can be measured between the two terminal portions 2b and 2c by using a direct current measuring bridge.

It is desirable to provide the two buffing pads 10 and 12 before and after the comparator in order to reduce the power change caused by slight tilting of the plate in its axial movement which would change the phase of the plate reflection. Such buffing improves the accuracy of comparison and makes for ease of operation. For best results, not less than 10db of buffing should be used.

While the invention has been described as applied to resistance elements of the thin metallic film type, it will be understood that it may be used for measuring other types of resistance elements.

From the foregoing it will be seen that my invention is well suited for the measurement of the uniformity of an elongated resistance element by selecting a wave guide which has a transverse dimension in the plane of the electric field which is small by comparison with the length of the resistor, so that only a limited linear section of the resistor is exposed to the high frequency energy in the wave guide for any given position of the resistor. Any variation in resistance of different linear sections of the resistor is indicated by changes in reading of the indicating meter.

I claim:

1. A device for comparing resistors of plate-like form comprising, a section of rectangular wave guide adapted to transmit electromagnetic waves of high frequency and having a passageway formed therein for the passage of said resistors transversely through said guide and comprising aligned slots formed in the broad walls of said guide, said slots being formed near the center of said walls, longitudinally thereof, and being of a size such that said plate-like resistors may be passed through said slots, and means arranged on the outside of said waveguide adjacent each slot and forming a guideway for inserting said resistors into said slots from either side of said waveguide.

2. A device according to claim 1 and including quick-releasable resilient means for holding a resistor in position in said slots.

3. A device according to claim 1 and including a choke element formed of loss-producing magnetic material arranged along one side of each slot on the outside of said wave guide.

4. A device according to claim 3 and including a resilient finger provided on the opposite side of each slot from the magnetic choke for pressing the resistor element towards the choke element.

5. A system for testing resistors of plate-like form comprising, in combination, a wave guide having longitudinal slots formed in opposite walls thereof and positioned in the plane of the electric field therein, said slots forming aligned openings through which said resistors may be inserted into said wave guide, means arranged on the outside of said waveguide adjacent each slot and forming a guideway for inserting said resistors into said slots from either side of said waveguide, a source of high frequency electromagnetic waves connected to an end of said guide, a detector connected to the other end, and a meter for indicating the detected current.

6. A system according to claim 5 and including fixed attenuator pads inserted in said guide both in front of and behind said slots.

7. A system according to claim 6 and including a variable buffer attenuator included between the source of high frequency waves and the front attenuator pad section of said guide.

8. A device for testing different linear sections of an elongated resistor comprising in combination a wave guide section adapted to transmit electromagnetic waves of high frequency and having a transverse dimension in the plane of the electric field therein which is small by comparison with the length of said resistor, and being provided with a pair of aligned openings through which said resistor may be passed so that a limited linear section of said resistor is exposed to the high frequency energy flowing in said wave guide at any given position of said resistor, said aligned openings being formed in opposite walls of said waveguide and in the plane of the electric field within said waveguide, and means for indicating the attenuating effect produced by said resistor upon the energy in said guide.

9. The method of testing the uniformity of different linear sections of an elongated resistor which consists in passing said resistor transversely through a wave guide carrying high frequency energy and parallel with the electric field therein, said waveguide having a transverse dimension in the plane of the electric field which is small with respect to the length of the resistor so that only a limited linear section of said resistor is exposed to said energy at any given time, and indicating the amount of wave energy transmitted in said guide past said resistor for different linear sections of said resistor.

10. The method of testing resistors for variations above a given high value and below a given low value which consists in transmitting high frequency electromagnetic wave energy through a wave guide, measuring said energy at a given point in said guide, inserting in said guide a resistor corresponding to said high value to attenuate the energy flowing in said guide, adjusting the energy supplied to said guide to produce a predetermined high reading at said given point, substituting a second known resistor of said low value and marking the resulting low reading at said point, then inserting the unknown resistors and measuring the transmitted energy for each unknown resistor.

11. A resistor testing system according to claim 5 wherein said meter is calibrated to indicate directly the resistance values of said platelike resistors.

12. A resistor testing system according to claim 5 and including fixed attenuator pads inserted in said guide both in front of and behind said slots and providing an attenuation of at least 10 decibels.

JOHN E. EBERT.

REFERENCES CITED

The following references are of record in the file of this patent:

UNITED STATES PATENTS

| Number | Name | Date |
|---|---|---|
| 2,151,118 | King et al. | Mar. 21, 1939 |
| 2,151,157 | Schelkunoff | Mar. 21, 1939 |
| 2,306,282 | Samuel | Dec. 22, 1942 |
| 2,337,934 | Scheldorf | Dec. 28, 1943 |
| 2,396,044 | Fox | Mar. 5, 1946 |
| 2,403,289 | Korman | July 2, 1946 |
| 2,412,805 | Ford | Dec. 17, 1946 |
| 2,427,094 | Evans | Sept. 9, 1947 |
| 2,456,012 | Muskat et al. | Dec. 14, 1948 |
| 2,457,695 | Liskow | Dec. 28, 1948 |
| 2,465,719 | Fernsler | Mar. 29, 1949 |
| 2,491,644 | Carlson | Dec. 20, 1949 |

OTHER REFERENCES

"Short Wave and Television", April 1938, pages 669, 706 and 707.

"Instruments," January 1947, page 6.

A. I. E. E. Technical Paper 46–40, January 1946, "Techniques and Facilities for Microwave Radar Testing"—Published by A. I. E. E.; 33 West 39th St., New York, N. Y.

Bell Laboratories Record, January 1946, pages 2 to 5.